(12) United States Patent
Mita et al.

(10) Patent No.: US 7,301,731 B2
(45) Date of Patent: Nov. 27, 2007

(54) HEAD ASSEMBLY HAVING MICROACTUATOR

(75) Inventors: Tsuyoshi Mita, Kawasaki (JP); Masaharu Hida, Kawasaki (JP); Kazuaki Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 694 days.

(21) Appl. No.: 10/352,002

(22) Filed: Jan. 28, 2003

(65) Prior Publication Data

US 2003/0231434 A1 Dec. 18, 2003

(30) Foreign Application Priority Data

Jun. 18, 2002 (JP) ............... 2002-176655

(51) Int. Cl.
*G11B 5/60* (2006.01)

(52) U.S. Cl. .................................. 360/294.4

(58) Field of Classification Search .............. 360/294.4
See application file for complete search history.

(56) References Cited

U.S. PATENT DOCUMENTS 6,661,617 B1 * 12/2003 Hipwell et al. .......... 360/294.4
6,738,231 B2 * 5/2004 Arya et al. ............... 360/294.4
6,961,221 B1 * 11/2005 Niu et al. ................. 360/294.4
2001/0026421 A1  10/2001 Mizuno et al.
2002/0097663 A1 * 7/2002 O'Neill ....................... 369/222
2003/0202290 A1 * 10/2003 Pan et al. ................. 360/294.4

FOREIGN PATENT DOCUMENTS

JP   WO96/36964   11/1996
JP   11-273041    10/1999

\* cited by examiner

*Primary Examiner*—William R. Korzuch
*Assistant Examiner*—Mark Blouin
(74) *Attorney, Agent, or Firm*—Staas & Halsey LLP

(57) ABSTRACT

When wire-bonding process is effected, a head assembly is held between a pair of clamp members. A head slider is urged against a microactuator. The urging force is transmitted to the microactuator through second adhesive layers. Since the second adhesive layers are positioned symmetrically around the rotational axis of the head slider, the urging force tends to act along the rotational axis. The microactuator is simultaneously urged against the support member. The urging force is transmitted from a first adhesive layer to the support member. Since the first adhesive layer extends around the rotational axis, the urging force tends to act along the rotational axis. The head slider is thus allowed to keep a uniform attitude. The microactuator is also allowed to keep a uniform attitude. The microactuator is prevented from suffering from substantial bending stresses.

11 Claims, 10 Drawing Sheets

HEAD ASSEMBLY HAVING MICROACTUATOR

BACKGROUND OF THE INVENTION

1. Field of the Invention

The present invention relates to a recording medium drive for managing information in a recording medium. In particular, the invention relates to a head assembly comprising: a head slider; an electrode terminal exposed at the surface of the head slider; a support member receiving the head slider on the surface of the support member; an electrically-conductive material exposed at the surface of the support member; a microactuator connecting the head slider to the support member; and an electrically-conductive wire connecting the electrode terminal to the electrically-conductive material.

2. Description of the Prior Art

As disclosed in Japanese Patent Application Publication 2001-210036, a head assembly having a microactuator is well known in the technical field of hard disk drives (HDDs). The microactuator in the head assembly of this type includes a pair of piezoelectric elements elongating and shrinking in response to supply of electric voltage. One ends of the piezoelectric elements are fixed to the support member, namely, to a so-called flexure. The other ends of the piezoelectric elements are fixed to the head slider. One of the piezoelectric elements elongates while the other of the piezoelectric elements shrinks. The swinging movement of the head slider is realized in this manner relative to the flexure.

Electrode terminals get exposed at the end surface near the inflow end of the head slider in the head assembly disclosed in the aforementioned publication. The electrode terminals are utilized to take out the output from the read head element mounted on the head slider. Likewise, the electrode terminals are utilized to supply an electric current to a write head element mounted on the head slider. Electrically-conductive wires are formed to establish electric connections between the electrode terminals on the head slider and wiring patterns extending over the flexure.

As is apparent from the aforementioned publication, ends of the piezoelectric elements are adhered to the flexure. Spaces are inevitably defined between the other ends of the individual piezoelectric elements and the flexure due to the thickness of the adhesive. When the head slider and the flexure are simultaneously held between a pair of clamp members during wire-bonding, the piezoelectric elements should suffer from bending stresses. If the head slider is solely held between the clamp members as disclosed in the aforementioned publication, the piezoelectric elements may be released from the bending stresses. However, the structure of the flexure should get complicated. This is not preferable.

SUMMARY OF THE INVENTION

It is accordingly an object of the present invention to provide a head assembly having a microactuator reliably contributing to realization of wire-bonding with a relatively simple structure.

According to a first aspect of the present invention, there is provided a head assembly comprising: a head slider spinning around the rotational axis penetrating through a medium-opposed surface defined on the head slider; an electrode terminal exposed at the surface of the head slider; a support member receiving the head slider on the surface of the support member; an electrically-conductive material exposed at the surface of the support member; a microactuator connecting the head slider to the support member; a first adhesive layer extending from the rotational axis over the surface of the support member, said first adhesive attaching the microactuator to the support member; second adhesive layers disposed symmetrically around the rotational axis, said second adhesive layers attaching the head slider to the microactuator; and an electrically-conductive wire connecting the electrode terminal to the electrically-conductive material.

Wire-bonding process may be utilized to form the electrically-conductive wire in the head assembly. The head assembly may be held between a pair of clamp members, for example. When the clamp members approach each other, the support member and the head slider receive an urging force on the rotational axis of the head slider from the clamp members. The head assembly is secured in this manner.

Now, assume that the microactuator is interposed between the head slider and the support member, for example. The head slider is urged against the microactuator. The urging force is transmitted to the microactuator through the second adhesive layers. Since the second adhesive layers are positioned symmetrically around the rotational axis, the urging force tends to act along the rotational axis. At the same time, the microactuator is urged against the support member. The urging force is transmitted from the first adhesive layer to the support member. Since the first adhesive layer extends around the rotational axis, the urging force tends to act along the rotational axis. A change can reliably be prevented in the attitude of the head slider relative to the microactuator. The head slider is thus allowed to keep a uniform attitude perpendicular to the rotational axis. Likewise, a change can reliably be prevented in the attitude of the microactuator relative to the support member in the same manner. The microactuator is thus allowed to keep a uniform attitude perpendicular to the rotational axis. The microactuator is prevented from suffering from substantial bending stresses.

The microactuator may comprise, for example: a piezoelectric element coupled to the support member with the first adhesive layer, said piezoelectric element elongating and shrinking in a direction defined to cross a straight line connecting the second adhesive layers to each other; a pair of attachment plates coupled to the piezoelectric element, said attachment plates getting distanced from each other in response to elongation of the piezoelectric element; and a pair of eccentric members coupled to the head slider with the second adhesive layers, each of the eccentric members connected to a corresponding one of the attachment plates.

When one of the attachment plates displaces in a first direction based on the elongation of the piezoelectric element, for example, the corresponding eccentric member likewise moves in the first direction. The other attachment plate displaces in a second direction opposite to the first direction. The corresponding eccentric member follows the displacement of the other attachment plate so as to move in the second direction. Since the second adhesive layers fixed to the head slider are positioned symmetrically around the rotation axis, a couple is generated around the rotational axis based on the movement of the eccentric members. In this manner, the head slider is allowed spin around the rotational axis.

According to a second aspect of the present invention, there is provided a head assembly comprising: a head slider spinning around the rotational axis penetrating through a medium-opposed surface defined on the head slider; an electrode terminal exposed at the surface of the head slider;

a support member receiving the head slider on the surface of the support member; an electrically-conductive material exposed at the surface of the support member; a microactuator connecting the head slider to the support member; first adhesive layers disposed symmetrically around the rotational axis, said first adhesive layers attaching the microactuator to the support member; second adhesive layers disposed symmetrically around the rotational axis, said second adhesive layers attaching the head slider to the microactuator; and an electrically-conductive wire connecting the electrode terminal to the electrically-conductive material.

The head assembly may be held between a pair of clamp members, for example, when wire-bonding process is to be effected, in the same manner as described above. When the clamp members approach each other, the support member and the head slider receive an urging force on the rotational axis of the head slider from the clamp members. The head assembly is secured in this manner.

Now, assume that the microactuator is interposed between the head slider and the support member, for example. The head slider is urged against the microactuator. The urging force is transmitted to the microactuator through the second adhesive layers. Since the second adhesive layers are positioned symmetrically around the rotational axis, the urging force tends to act along the rotational axis. At the same time, the microactuator is urged against the support member. The urging force is transmitted from the first adhesive layers to the support member. Since the first adhesive layers are positioned symmetrically around the rotational axis, the urging force tends to act along the rotational axis. A change can reliably be prevented in the attitude of the head slider relative to the microactuator. The head slider is thus allowed to keep a uniform attitude perpendicular to the rotational axis. Likewise, a change can reliably be prevented in the attitude of the microactuator relative to the support member in the same manner. The microactuator is thus allowed to keep a uniform attitude perpendicular to the rotational axis. The microactuator is prevented from suffering from substantial bending stresses.

According to this aspect, the microactuator may comprise: a piezoelectric element coupled to the support member with the first adhesive layers, said piezoelectric element elongating and shrinking in a direction defined to cross a straight line connecting the second adhesive layers to each other; a pair of attachment plates coupled to the piezoelectric element, said attachment plates getting distanced from each other in response to elongation of the piezoelectric element; and a pair of eccentric members coupled to the head slider with the second adhesive layers, each of the eccentric members connected to a corresponding one of the attachment plates. The microactuator of this type allows the first adhesive layers to be interposed between the piezoelectric element and the support member over a larger area. The aforementioned urging force is reliably transmitted along the rotational axis.

Alternatively, the microactuator may comprise a piezoelectric element coupled to the support member with the first adhesive layers at first and second places, said piezoelectric element coupled to the head slider with the second adhesive layer at a position established between the first and second places. The piezoelectric element of this type allows the first adhesive layers to equally receive the urging force from the second adhesive layer. The aforementioned urging force is reliably transmitted along the rotational axis. Moreover, since the piezoelectric element is stably supported at the opposite ends by the first adhesive layers, the piezoelectric element is surely prevented from suffering from a larger bending stress.

A pair of the piezoelectric actuators are incorporated within the microactuator of the aforementioned type. The piezoelectric elements are designed to extend in parallel with each other from the first places to the second places in a predetermined direction. Each of the piezoelectric element includes: a first driving section elongating and shrinking between the first place and the second adhesive layer; and a second driving section elongating and shrinking between the second place and the second adhesive layer. The elongation and shrinkage of the second driving section is controlled separately from the elongation and shrinkage of the first driving section in the individual piezoelectric element. Specifically, while the first driving section shrinks in one of the piezoelectric elements, the second driving section shrinks in the other piezoelectric element, for example. A couple is generated in this manner around the rotational axis.

Alternatively, the microactuator may comprise a pair of piezoelectric elements, each adhered to the support member with the first adhesive layer at one end of the piezoelectric element, the other end of each of the piezoelectric elements being adhered to the head slider with the second adhesive layer. One of the piezoelectric elements is designed to extend in a first direction from the first adhesive layer while the other piezoelectric element is designed to extend from the first adhesive layer in a second direction opposite to the first direction. When the piezoelectric elements get shrunk, a couple is generated around the rotational axis.

Otherwise, the microactuator may comprise a piezoelectric element received on the support member in parallel with the head slider. In this case, the height of the piezoelectric element measured from the surface of the support member is preferably set smaller than the height of the head slider. When the support member and the head slider are held between the clamp members in the aforementioned manner, the piezoelectric element can be prevented from contacting the clamp members. The piezoelectric element suffers from no urging force at all. In addition, the clamp members still serve to prevent a change in the attitude of the head slider and the support member. The piezoelectric element is reliably prevented from suffering from substantial bending stresses.

According to a third aspect of the present invention, there is provided a head assembly comprising: a head slider spinning around the rotational axis penetrating through a medium-opposed surface defined on the head slider; an electrode terminal exposed at the surface of the head slider; a support member receiving the head slider on the surface of the support member; an electrically-conductive material exposed at the surface of the support member; a microactuator connecting the head slider to the support member; first adhesive layers attaching the microactuator to the support member; a second adhesive layer disposed in a space defined between the first adhesive layers, said second adhesive layer attaching the head slider to the microactuator; and an electrically-conductive wire connecting the electrode terminal to the electrically-conductive material.

The head assembly may be held between a pair of clamp members, for example, when wire-bonding process is to be effected, in the same manner as described above. When the clamp members approach each other, the support member and the head slider receive an urging force on the rotational axis of the head slider from the clamp members. The head assembly is secured in this manner.

Now, assume that the microactuator is interposed between the head slider and the support member, for example. The head slider is urged against the microactuator. The urging force is transmitted to the microactuator through the second adhesive layer. The first adhesive layers serve to disperse the urging force acting from the second adhesive layer. Since the piezoelectric element is stably supported at the opposite ends by the first adhesive layers, the piezoelectric element is surely prevented from suffering from a larger bending stress. Here, the microactuator may comprise a piezoelectric element adhered to the support member with the first adhesive layers at separate places, said piezoelectric actuator being adhered to the head slider with the second adhesive layer in a space between the first adhesive layers. In this case, the piezoelectric element may include a first driving section elongating and shrinking between one of the first adhesive layer and the second adhesive layer; and a second driving section elongating and shrinking between an other of the first adhesive layer and the second adhesive layer. The elongation and shrinkage of the second driving section should be controlled separately from the elongation and shrinkage of the first driving section.

According to a fourth aspect of the present invention, there is provided a head assembly comprising: a head slider spinning around the rotational axis penetrating through a medium-opposed surface defined on the head slider; an electrode terminal exposed at the surface of the head slider; a support member receiving the head slider on the surface of the support member; an electrically-conductive material exposed at the surface of the support member; a microactuator received on the support member in parallel with the head slider; and an electrically-conductive wire connecting the electrode terminal to the electrically-conductive material. In particular, the height of the piezoelectric element measured from the surface of the support member is preferably set smaller than the height of the head slider.

When the support member and the head slider are held between the clamp members in wire-bonding process, the piezoelectric element can be prevented from contacting the clamp members. The piezoelectric element suffers from no urging force at all. In addition, the clamp members still serve to prevent a change in the attitude of the head slider and the support member. The piezoelectric element is reliably prevented from suffering from substantial bending stresses.

According to a fifth aspect of the present invention, there is provided a method of wiring for a head assembly including a microactuator, comprising: securing a head suspension of the head assembly; locating the head suspension and a head slider, that is mounted on the head suspension, between first and second support surfaces spaced at a distance, without applying an urging force to the head slider and the head suspension from the first and second support surfaces; and subjecting an electrode on the head slider to wire-bonding, said first and second surfaces contacting the head slider to restrict displacement of the head slider during the wire-bonding.

No urging force is applied to the head slider during the wire-bonding in the method of this type. Even if the microactuator is interposed between the head slider and the head suspension, the microactuator is reliably prevented from receiving an urging force. The microactuator is reliably prevented from damages during the wire-bonding.

The method of this type may comprise: lowering a capillary so as to contact a wire at the tip end of the capillary against the surface of an electrically-conductive terminal on the head suspension when the wire-bonding is to be effected; raising the capillary so as to distance the capillary from the surface of the electrically-conductive terminal in a first direction perpendicular to the surface of the electrically-conductive terminal; rotating the head suspension around a predetermined rotational axis so as to oppose the tip end of the capillary to the surface of the electrode; and lowering the capillary so as to contact the wire at the tip end of the capillary against the surface of the electrode. Alternatively, the method may comprise: lowering a capillary so as to contact a wire at the tip end of the capillary against the surface of the electrode when the wire-bonding is to be effected; raising the capillary so as to distance the capillary from the surface of the electrode in a first direction perpendicular to the surface of the electrode; rotating the head suspension around a predetermined rotational axis so as to oppose the tip end of the capillary to the surface of an electrically-conductive terminal; and lowering the capillary so as to contact the wire at the tip end of the capillary against the surface of the electrically-conductive terminal.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
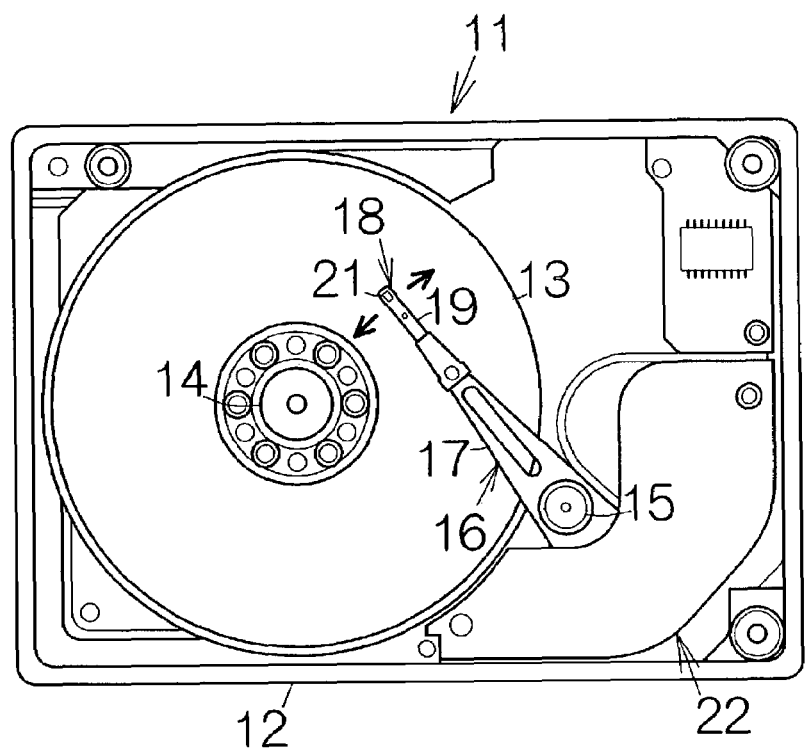
FIG. 1 is a plan view schematically illustrating the structure of a hard disk drive (HDD) according to a specific example.

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is incorporated in the inner space within the primary enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A carriage 16 is also incorporated within the inner space of the primary enclosure 12. The carriage 16 is designed to swing around a vertical support shaft 15. The carriage 16 includes rigid actuator arms 17 extending in a horizontal direction from the vertical support shaft 15, and head suspension assemblies 18 attached to the tip or front ends of the actuator arms 17. A head suspension 19 is allowed to extend forward from the front end of the actuator arm 17 in the individual head suspension assembly 18. The head suspension 19 includes a load beam capable of resiliently swinging relative to the actuator arm 17 based on the elastic deformation.

A flying head slider 21 is supported on the front end of the individual head suspension 19. The load beam serves to generate an urging force on the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a lift on the flying head slider 21. The flying head slider 21 is thus allowed to keep flying above the surface of the magnetic recording disk 13 during the rotation of the magnetic recording disk 13 at a higher stability established by the balance between the lift and the urging force from the load beam.

When the carriage 16 is driven to swing about the support shaft 15 during flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13. In this case, a power source 22 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the actuator arms 17 and the head suspension assemblies 18 are disposed between the adjacent magnetic recording disks 13.

Figure 2:
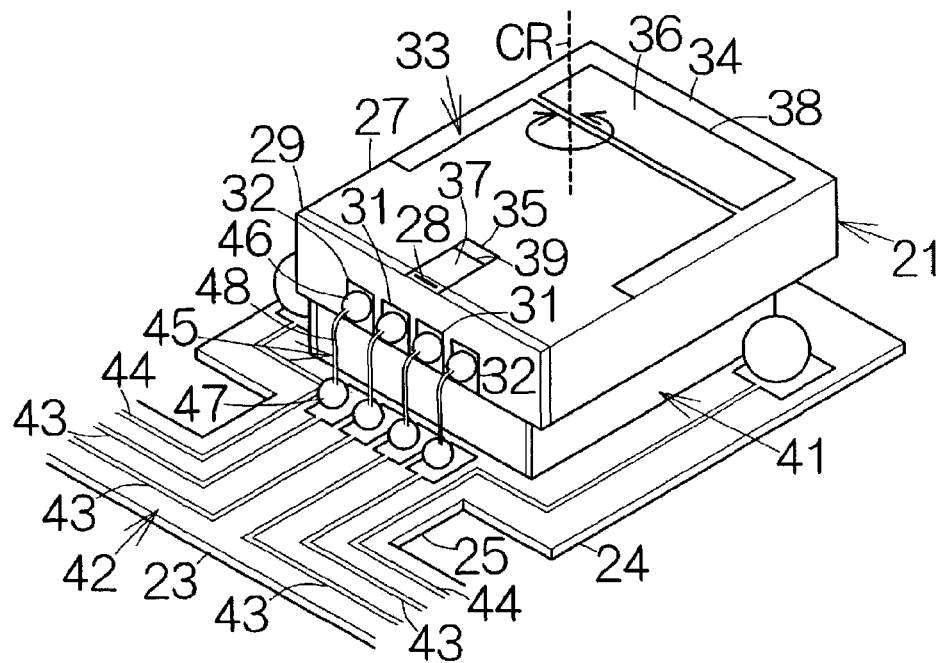
FIG. 2 is an enlarged partial perspective view of a head suspension assembly.

As shown in FIG. 2, a flexure 23 is fixed to the front end of the load beam in the head suspension assembly 18. A plate member 24 is defined in the flexure 23. The plate member 24 may be punched out of a material for the flexure 23. The plate member 24 is allowed to change its attitude by the action of a so-called gimbal spring 25. The flying head slider 21 is received on the surface of the plate member 24. The attitude of the flying head slider 21 can be changed during flight relative to the surface of the magnetic recording disk 13 based on the action of the gimbal spring 25.

The flying head slider 21 includes a slider body 27 of a flat parallelepiped, for example, made of $Al_2O_3$-TiC. A read/write electromagnetic transducer or head 28 is mounted on the slider body 27. The read/write electromagnetic transducer 28 is embedded within a protection film 29, made of $Al_2O_3$, coupled to the trailing or outflow end of the slider body 27. The read/write electromagnetic transducer 28 may include a read element, such as giant magnetoresistive (GMR) element and a tunnel-junction magnetoresistive (TMR) element, designed to read magnetic bit data out of the magnetic recording disk 13 and a write element, such as a thin film magnetic head, designed to write information data into the magnetic recording disk 13, for example.

Pairs of electrode terminals 31, 32 are disposed on the outflow end of the flying head slider 21, namely, on the surface of the protection film 29. The electrode terminals 31, 31 are electrically connected to the read element of the read/write electromagnetic transducer 28, for example. A sensing current is supplied to the read element through the electrode terminals 31, 31. Variation in the voltage of the sensing current appears at the electrode terminals 31, 31. The electrode terminals 32, 32 are electrically connected to the write element of the read/write electromagnetic transducer 28, for example. The electrode terminals 32, 32 are utilized to supply to the write element an electric current corresponding to bit data signals. A magnetic field is induced at a thin film coil pattern, for example, in response to the supply of the electric current.

A medium-opposed surface or bottom surface 33 is defined to continuously extend over the slider body 27 and the protection film 29. The flying head slider 21 is opposed to the magnetic recording disk 13 at the bottom surface 33. A front rail 34 is formed in the bottom surface 33 so as to extend along the inflow end of the slider body 27. Likewise, a rear rail 35 is formed in the bottom surface 33 near the outflow end of the slider body 27. So-called air bearing surfaces (ABS) 36, 37 are defined on the top surfaces of the front and rear rails 34, 35, respectively. The inflow ends of the air bearing surfaces 36, 37 are connected to the top surfaces of the front and rear rails 34, 35 via steps 38, 39. The read/write electromagnetic transducer 28 is designed to expose the front end thereof at the air bearing surface 37. It should be noted that a protection film such as a diamond-like-carbon (DLC) film may additionally be formed on the air bearing surface 37 so as to cover over the front end of the read/write electromagnetic transducer 28.

The bottom surface 33 of the flying head slider 21 receives airflow generated along the rotating magnetic recording disk 13. In this case, the steps 38, 39 greatly contribute to generation of a larger positive pressure or lift on the air bearing surfaces 36, 37. In addition, a larger negative pressure is generated behind the front rail 34. The attitude of the flying head slider 21 during flight can be determined based on the balance between the lift and the negative pressure. The flying head slider 21 may take any shape or structure other than the aforementioned one.

A microactuator 41 is interposed between the flying head slider 21 and the plate member 24 of the flexure 23. The microactuator 41 couples the flying head slider 21 to the plate member 24. The microactuator 41 is designed to drive the flying head slider 21 for rotation around the rotational axis CR penetrating through the bottom surface 33. The rotational axis CR should intersect the surface of the plate member 24 at right angles. The structure of the microactuator will be described later in detail.

A wiring pattern 42 is formed to extend over the surface of the flexure 23. The wiring pattern 42 includes an electrically-conductive pattern 43 utilized to supply the aforementioned currents to the read and write elements, and an electrically-conductive pattern 44 utilized to supply a driving voltage for the microactuator 41. The electrically-conductive pattern 43 has surfaces extending within a horizontal plane perpendicular to a vertical plane including the surfaces of the electrode terminals 31, 32.

Electrically-conductive wires 45 connect the electrically-conductive pattern 43 to the electrode terminals 31, 32. The individual electrically-conductive wire 45 includes a first contact 46 standing on the surface of the electrode terminal 31, 32, and a second contact 47 standing on the surface of the electrically-conductive pattern 43. The first and second contacts 46, 47 are connected to each other with a wire body 48. The wire body 48 bends to absorb the angular difference of 90 degrees between the first and second contacts 46, 47.

Figure 3:
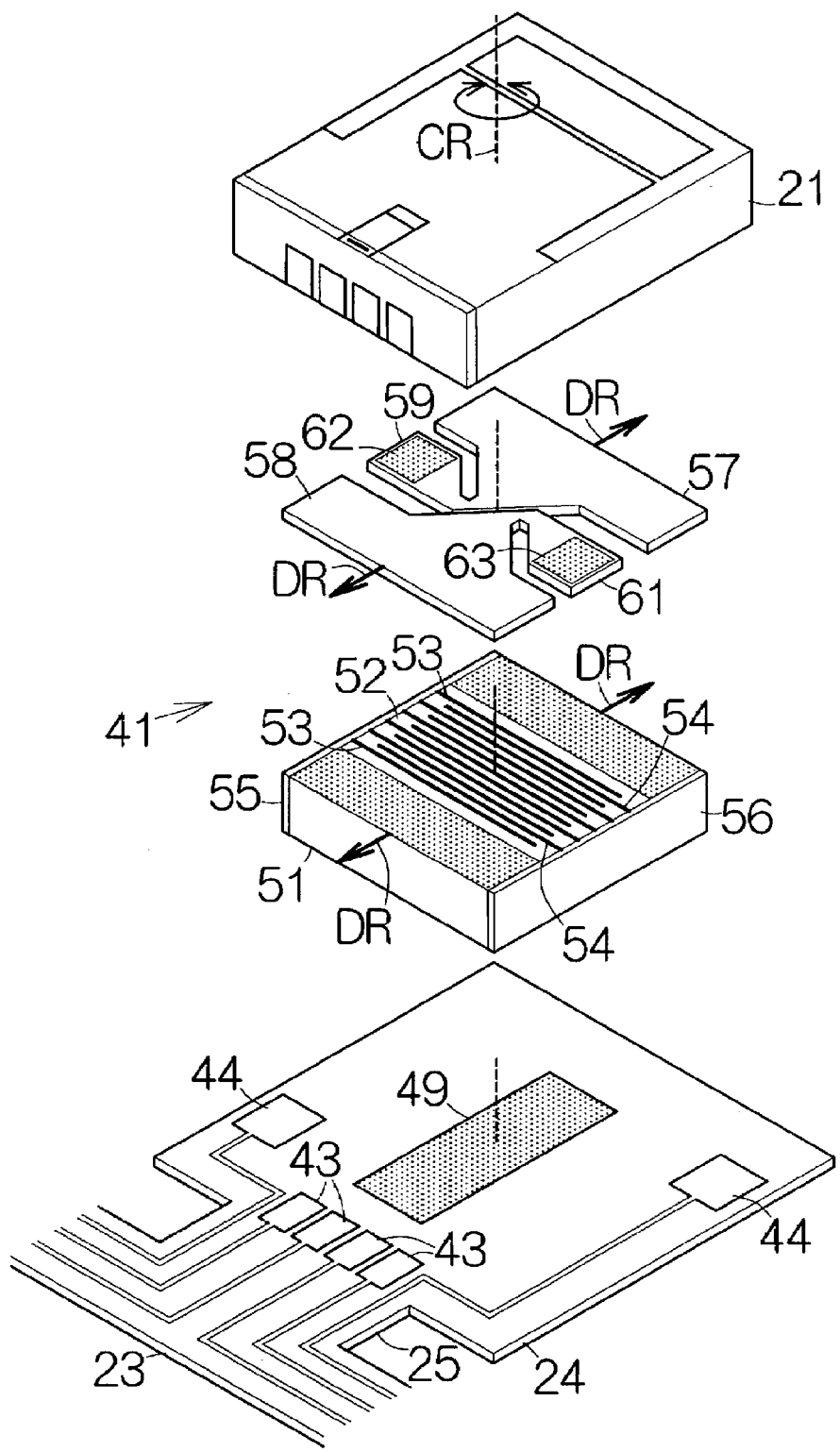
FIG. 3 is an exploded view of the head suspension assembly for schematically illustrating structure of a microactuator according to a first embodiment of the present invention.

As shown in FIG. 3, the microactuator 41 of a first embodiment includes a piezoelectric element 51 fixed to the plate member 24 with a first adhesive layer 49. The first adhesive layer 49 is allowed to extend outward from the rotational axis CR toward the periphery. The first adhesive layer 49 has a constant thickness ranging from 5 μm to 20 μm, for example. The first adhesive layer 49 may be made of an epoxy adhesive or the like.

The piezoelectric element 51 is made of a multilayered structure 52 of piezoelectric ceramic thin plates. The piezoelectric ceramic thin plates are sequentially layered from the inflow or front side to the outflow or rear side in the attitude upright to the surface of the plate member 24. First and second electrode layers 53, 54 are alternately interposed between the adjacent piezoelectric ceramic thin plates. The piezoelectric ceramic thin plates may be made of a piezoelectric material such as PNN-PT-PZ, for example.

A first electrode terminal layer 55 is coupled to the outer surface of the multilayered structure 52. All the first electrode layers 53 are connected to the first electrode terminal layer 55. Likewise, a second electrode terminal layer 56 is coupled to the outer surface, opposite to the aforementioned outer surface, of the multilayered structure 52. All the second electrode layers 54 are connected to the second electrode terminal layer 56. When a driving voltage is applied to the first and second electrode terminal layers 55, 56 from the electrically-conductive pattern 44, the polarization is first established in the individual piezoelectric ceramic thin plates in accordance with the direction of the driving voltage between the first and second electrode layers 53, 54. The driving voltage is further supplied in the direction of the polarization, so that the piezoelectric element 51 is allowed to elongate in a predetermined direction DR, namely, the longitudinal direction of the flying head slider 21. The first and second electrode layers 53, 54 as well as the first and second electrode terminal layers 55, 56 may be made of an electrically-conductive metallic material such as Pt, for example.

A first attachment plate 57 is fixed to the surface of the piezoelectric element 51 adjacent the front piezoelectric ceramic thin plate closest to the inflow end of the flying head slider 21. Likewise, a second attachment plate 58 is fixed to the surface of the piezoelectric element 51 adjacent the rearmost piezoelectric ceramic thin plate closest to the outflow end of the flying head slider 21. When the electric element 51 elongates, the first and second attachment plates 57, 58 get distanced from each other. An epoxy adhesive or the like may be employed to fixed the first and second attachment plates 57, 58 to the piezoelectric element 51.

Eccentric members 59, 61 are independently connected to the first and second attachment plates 57, 58. The eccentric members 59, 61 may be located at positions eccentric to the rotational axis CR between the first and second attachment plates 57, 58. Second adhesive layers 62, 63 serve to adhere the eccentric members 59, 61 to the flying head slider 21. The positions of the second adhesive layers 62, 63 are set symmetric relative to the rotational axis CR within a plane perpendicular to the rotational axis CR. When the piezoelectric element 51 elongates, the eccentric member 59 is pulled back toward the inflow or front end of the flying head slider 21. At the same time, the eccentric member 61 is pulled back to the outflow or rear end of the flying head slider 21. A couple is in this manner generated around the rotational axis CR. The flying head slider 21 is thus forced to rotate around the rotational axis CR. The second adhesive layers 62, 63 may have a uniform thickness ranging between 5 μm and 20 μm, for example. The second adhesive layers 62, 63 may be made of an epoxy adhesive or the like.

Now, assume that the read/write electromagnetic transducer 28 on the flying head slider 21 is to be positioned right above a target recording track on the magnetic recording disk 13. The controller chip within the aforementioned HDD 11 is set to supply electric signals ranging 0[V] and 30[V] to the microactuator 41. When the piezoelectric element 51 receives the maximum voltage of 30[V], the piezoelectric element 51 elongates by the maximum amount. The maximum stroke of approximately 1.0 μm can be ensured for the read/write electromagnetic transducer 28 on the plate member 24 in a direction mostly perpendicular to the recording track.

The electric signal of 15[V] is supplied to the microactuator 41 so as to establish the standard attitude of the flying head slider 21. The read/write electromagnetic transducer 28 is displaced by half the maximum stroke, namely, by 0.5 μm approximately on the plate member 24. Subsequently, the carriage 16 including the actuator arm 17 is driven to swing, so that the read/write electromagnetic transducer 28 is positioned relative to the target recording track.

The read/write electromagnetic transducer 28 is then allowed to start tracing the recording track. The controller chip is designed to supply electric signals to the microactuator 41 based on a servo control. When the voltage of the electric signal decreases from 15[V], the piezoelectric element 51 shrinks in the predetermined direction DR. The flying head slider 21 is allowed to rotate around the rotational axis CR in the counterclockwise direction. This rotation of the flying head slider 21 serves to displace the read/write electromagnetic transducer 28 in the radial direction of the magnetic recording disk 13. To the contrary, when the voltage of the electric signal increases from 15[V], the piezoelectric element 51 elongates in the predetermined direction DR. The flying head slider 21 is allowed to rotate around the rotational axis CR in the clockwise direction. This rotation of the flying head slider 21 generates a displacement of the read/write electromagnetic transducer 28 in the direction opposite to the aforementioned radial direction of the magnetic recording disk 13. In this manner, the read/write electromagnetic transducer 28 keeps tracing the recording tracks at a higher accuracy.

The aforementioned head suspension assembly 18 utilizes the rotation of the flying head slider 21 so as to minutely displace the read/write electromagnetic transducer 28. The moment of inertia can be reduced in the rotating flying head slider 21. A smaller moment solely acts on the microactuator 41. A higher natural frequency can be obtained in the vibrating system comprising the flying head slider 21 and the microactuator 41. A wider frequency range can be ensured for the servo signals for the displacement of the read/write electromagnetic transducer 28.

Wire-bonding process is employed to form the electrically-conductive wires 45 in the aforementioned head suspension assembly 18. The microactuator 41 and the flying head slider 21 are mounted on the plate member 24 of the flexure 23 prior to the execution of the wire-bonding process. The first adhesive layer 49 serves to couple the microactuator 41 to the surface of the plate member 24. The second adhesive layers 62, 63 serve to couple the flying head slider 21 to the eccentric members 59, 61 of the microactuator 41, respectively.

Figure 4:
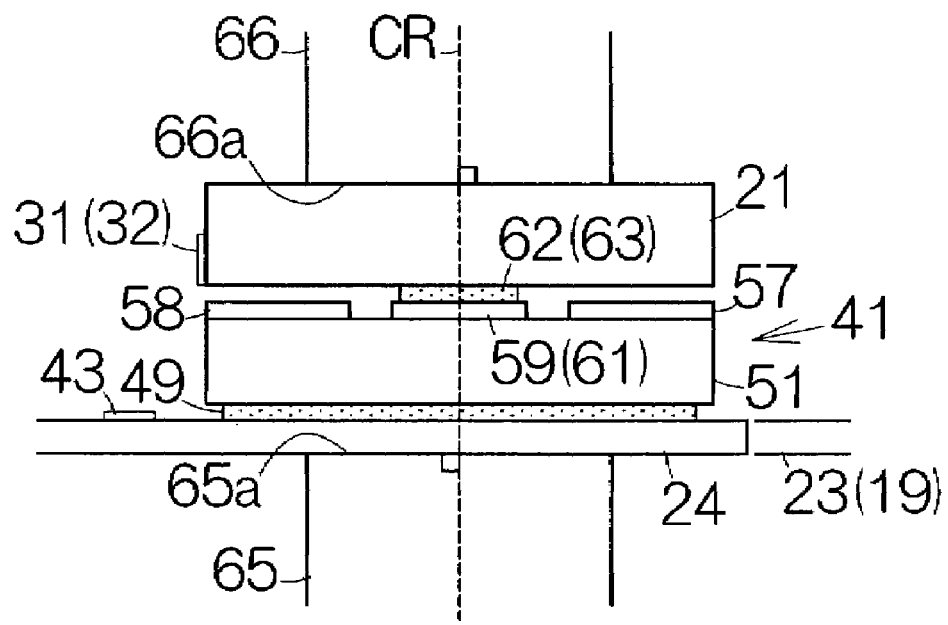
FIG. 4 is an enlarged partial side view of the head suspension assembly held between clamp members when wire-bonding process is to be effected.

The head suspension assembly 18 is then set on a working table, not shown, of a wire-bonder. The head suspension 19 is held between a pair of clamp members 65, 66, for example, as shown in FIG. 4. Contact surfaces 65a, 66a are defined on the clamp members 65, 66, respectively. The contact surfaces 65a, 66a are designed to extend within planes perpendicular to the rotational axis CR. When the clamp members 65, 66 are driven to approach each other, the plate member 24 and the flying head slider 21 receive the urging force from the contact surfaces 65a, 66a in the direction of the rotational axis CR. The head suspension assembly 18 is secured on the working table of the wire-bonder.

When the head suspension assembly 18 is held between the clamp members 65, 66, the flying head slider 21 is urged against the microactuator 41. The urging force is transmitted from the second adhesive layers 62, 63 to the microactuator 41. Since the second adhesive layers 62, 63 are positioned symmetrically around the rotational axis CR, the urging force tends to act on the rotational axis CR. At the same time, the microactuator 41 is urged against the plate member 24. The urging force is transmitted from the first adhesive layer 49 to the plate member 24. Since the first adhesive layer 49 extends around the rotational axis CR, the urging force tends to act on the rotational axis CR. In this manner, a change can reliably be prevented in the attitude of the flying head slider 21 relative to the microactuator 41. The flying head slider 21 is allowed to keep a uniform attitude perpendicular to the rotational axis CR. A change can also reliably be prevented in the attitude of the microactuator 41 relative to the plate member 24 in the same manner. The microactuator 41 is allowed to keep a uniform attitude perpendicular to the rotational axis CR. The piezoelectric element 51 is prevented from suffering from any bending stresses.

Figure 5:
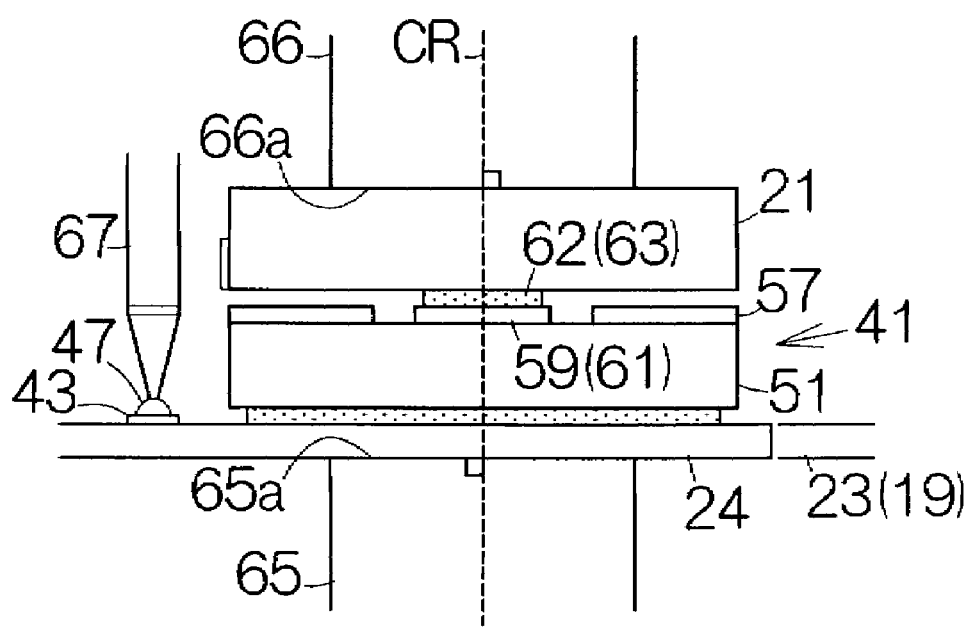
FIG. 5 is an enlarged partial side view of the head suspension assembly for schematically illustrating a process of making an electrically-conductive wire.

When the head suspension assembly 18 has been set on the working table of the wire-bonder, a capillary 67 is lowered toward the surface of the electrically-conductive pattern 43. The tip end of the capillary 67 approaches the surface of the electrically-conductive pattern 43 in a direction orthogonal to the surface of the electrically-conductive pattern 43. As shown in FIG. 5, a bonding-wire is then supplied to the surface of the electrically-conductive pattern 43 from the tip end of the capillary 67. The capillary 67 forms the second contact 47.

Figure 6:
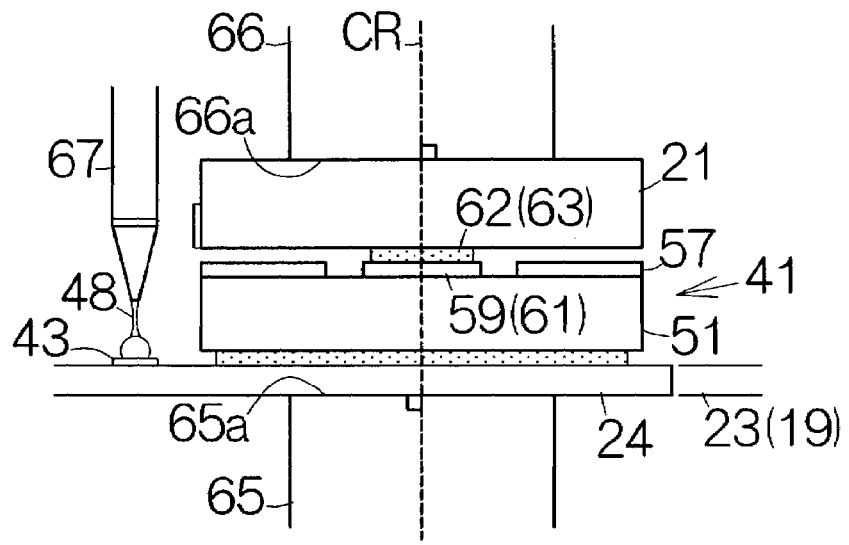
FIG. 6 is an enlarged partial side view of the head suspension assembly for schematically illustrating the process of making the electrically-conductive wire.

The capillary 67 is thereafter raised. The capillary 67 is distanced from the surface of the electrically-conductive pattern 43 in the direction orthogonal to the surface of the electrically-conductive pattern 43. As shown in FIG. 6, the capillary 67 forms the wire body 48 integrally extending upward from the second contact 47 in the direction orthogonal to the surface of the electrically-conductive pattern 43. The formation of the wire body 48 is subsequently kept based on the bonding wire supplied out of the capillary 67.

Figure 7:
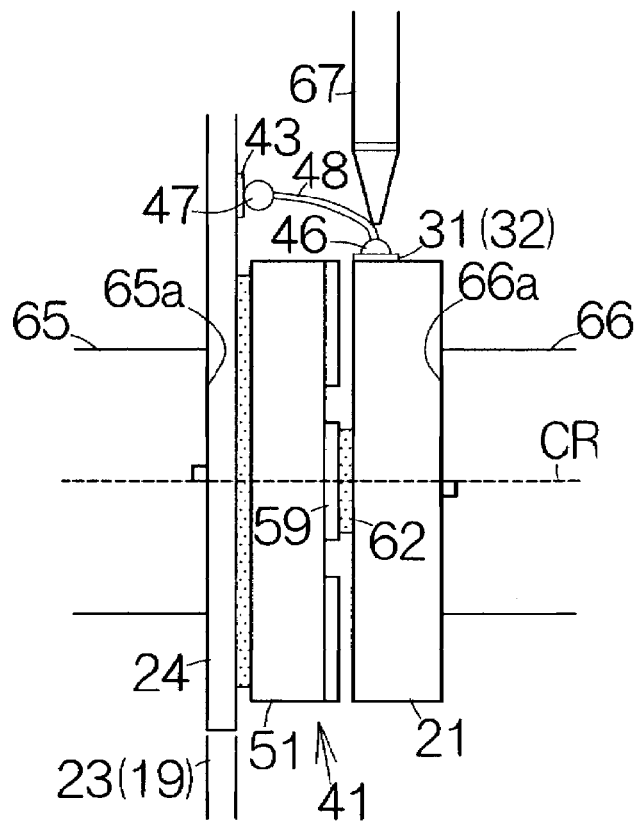
FIG. 7 is an enlarged partial side view of the head suspension assembly for schematically illustrating the process of making the electrically-conductive wire.

The working table is then driven for rotation around a predetermined axis during the formation of the wire body 48. The rotation of the working table enables the tip end of the capillary 67 to face the electrode terminals 31, 32 on the flying head slider 21. The capillary 67 is then lowered again. The tip end of the capillary 67 approaches the surface of the electrode terminal 31, 32 in the direction orthogonal to the surface of the electrode terminal 31, 32. As shown in FIG. 7, the first contact 46 is then formed on the surface of the electrode terminal 31, 32. When the first contact 46 has been formed, the formation of the wire body 48 gets finished. The electrically-conductive wire 45 has thus been obtained.

The plate member 24, the microactuator 41 and the flying head slider 21 may be released from the urging force when the head suspension assembly 18 is secured to the working table in the wire-bonding process. In this case, the load beam may be held between the clamp members 65, 66, for example. The plate member 24, the microactuator 41 and the flying head slider 21 is prevented from the contact to the clamp members 65, 66. The plate member 24, the microactuator 41 and the flying head slider 21 are kept out of a space defined between the clamp members 65, 66.

Figure 8:
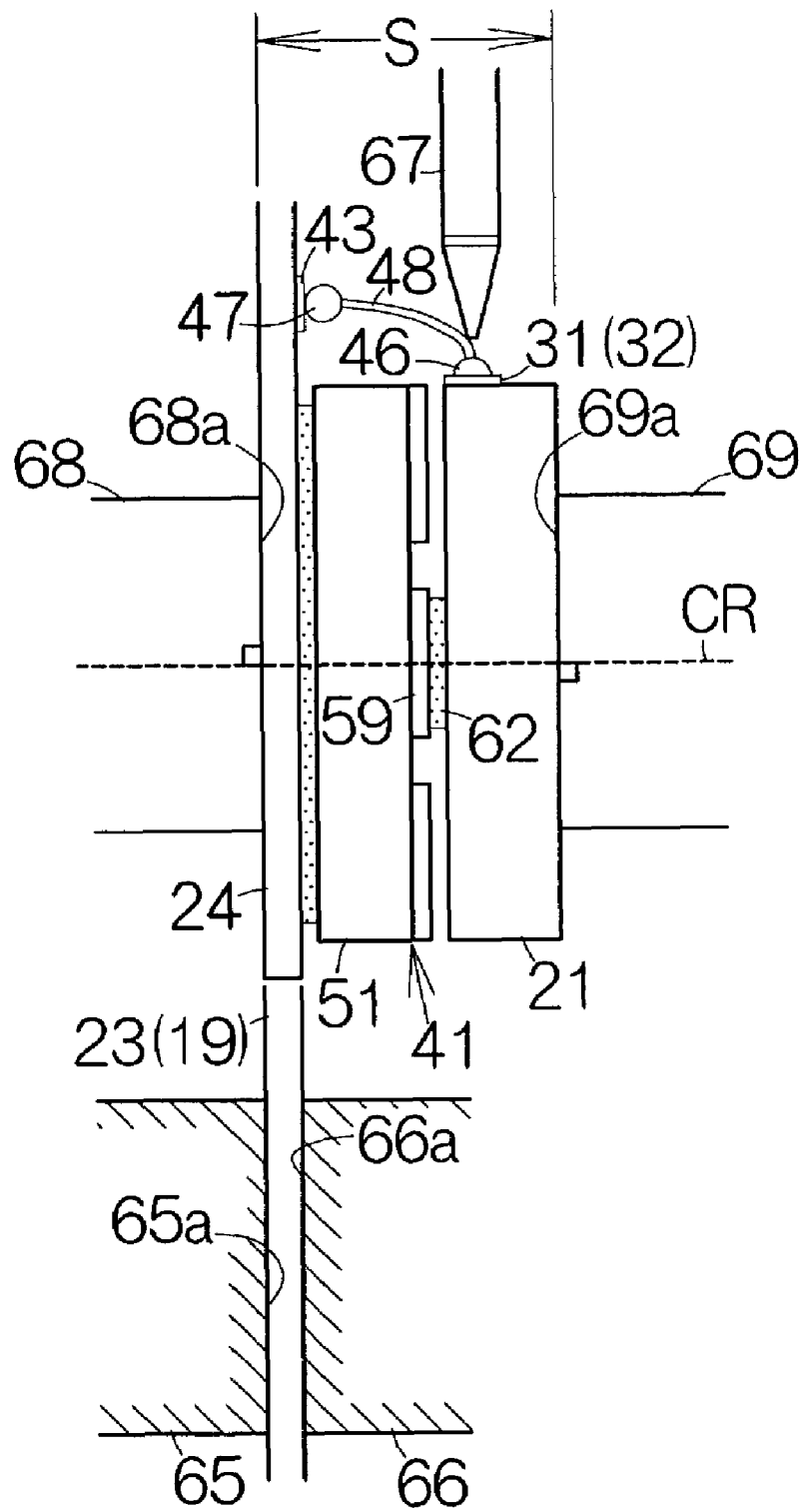
FIG. 8 is an enlarged partial side view of the head suspension assembly supported by support members when wire-bonding process is to be effected.

In this situation, first and second support members 68, 69 are preferably disposed adjacent the head suspension 19 on the working table, for example, as shown in FIG. 8. A first support plane 68a of the first support member 68 is opposed to a second support plane 69a of the second support member 69. The first and second support planes 68a, 69a are held in parallel with each other. In addition, a predetermined distance S is set between the first and second support planes 68a, 69a. The plate member 24, the microactuator 41 and the flying head slider 21 are positioned within a space between the first and second support planes 68a, 69a. The first and/or second planes 68a, 69a may be allowed to touch the plate member 24 and/or the flying head slider 21. In any event, the plate member 24 and the flying head slider 21 should be prevented from receiving any urging force.

When the plate member 24, the microactuator 41 and the flying head slider 21 are positioned in a space between the first and second support planes 68a, 69a, the plate member 24, the microactuator 41 and the flying head slider 21 are prevented from any displacement between the first and second support planes 68a, 69a. Accordingly, the electrically-conductive pattern 43 on the plate member 24 as well as the electrode terminals 31, 32 on the flying head slider 21 are reliably prevented from a shift. The capillary 67 can be positioned on the electrically-conductive pattern 43 and the electrode terminals 31, 32 at a higher accuracy. If the plate member 24 and the flying head slider 21 is reliably prevented from a shift in this manner, the electrically-conductive wires 45 can reliably be prevented from a critical deformation or damages during wire-bonding processes.

Figure 9:
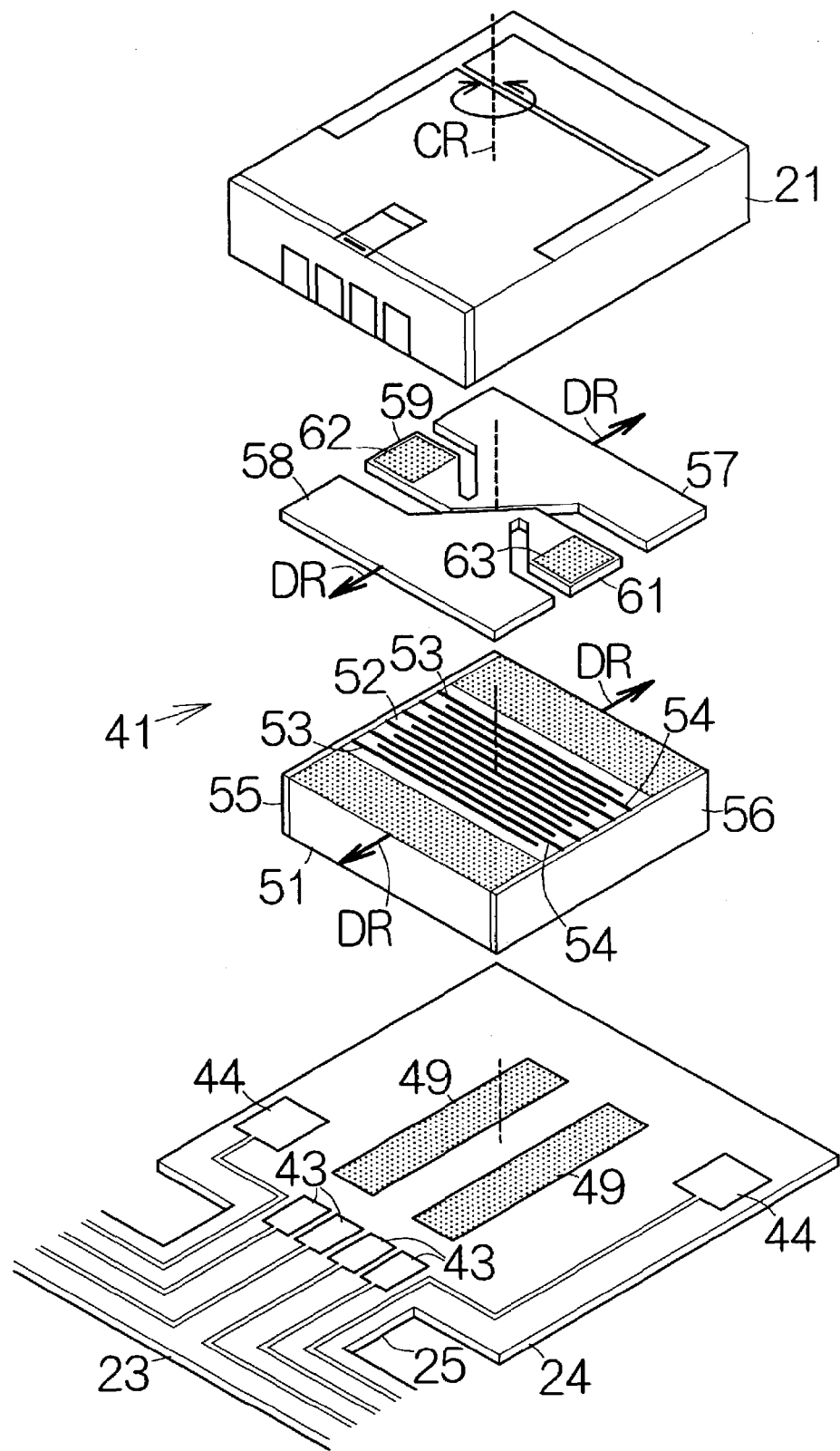
FIG. 9 is an exploded view, corresponding to FIG. 3, of a head suspension assembly according to a modified example of the first embodiment.

The first contact 46 may first be formed on the electrode terminals 31, 32 prior to the rotation of the head suspension assembly 18 in the aforementioned wire-bonding process. In this case, the wire body 48 is formed to extend from the first contact 46 in the direction orthogonal to the surface of the electrode terminals 31, 32 based on the rise of the capillary 67. The working table is thereafter driven to rotate during the formation of the wire body 48. The second contact 47 is then formed on the electrically-conductive pattern 43 based on the descent of the capillary 67 after the rotation of the head suspension assembly 18. Alternatively, the first adhesive layer 49 may not always be required to extend from the rotational axis CR in the aforementioned microactuator 41, as shown in FIG. 9, for example. In this case, the first adhesive layers 49 may be located at symmetric positions around the rotational axis CR within a plane perpendicular to the rotational axis CR. This structure is also allowed to enjoy the aforementioned advantages of the invention.

Figure 10:
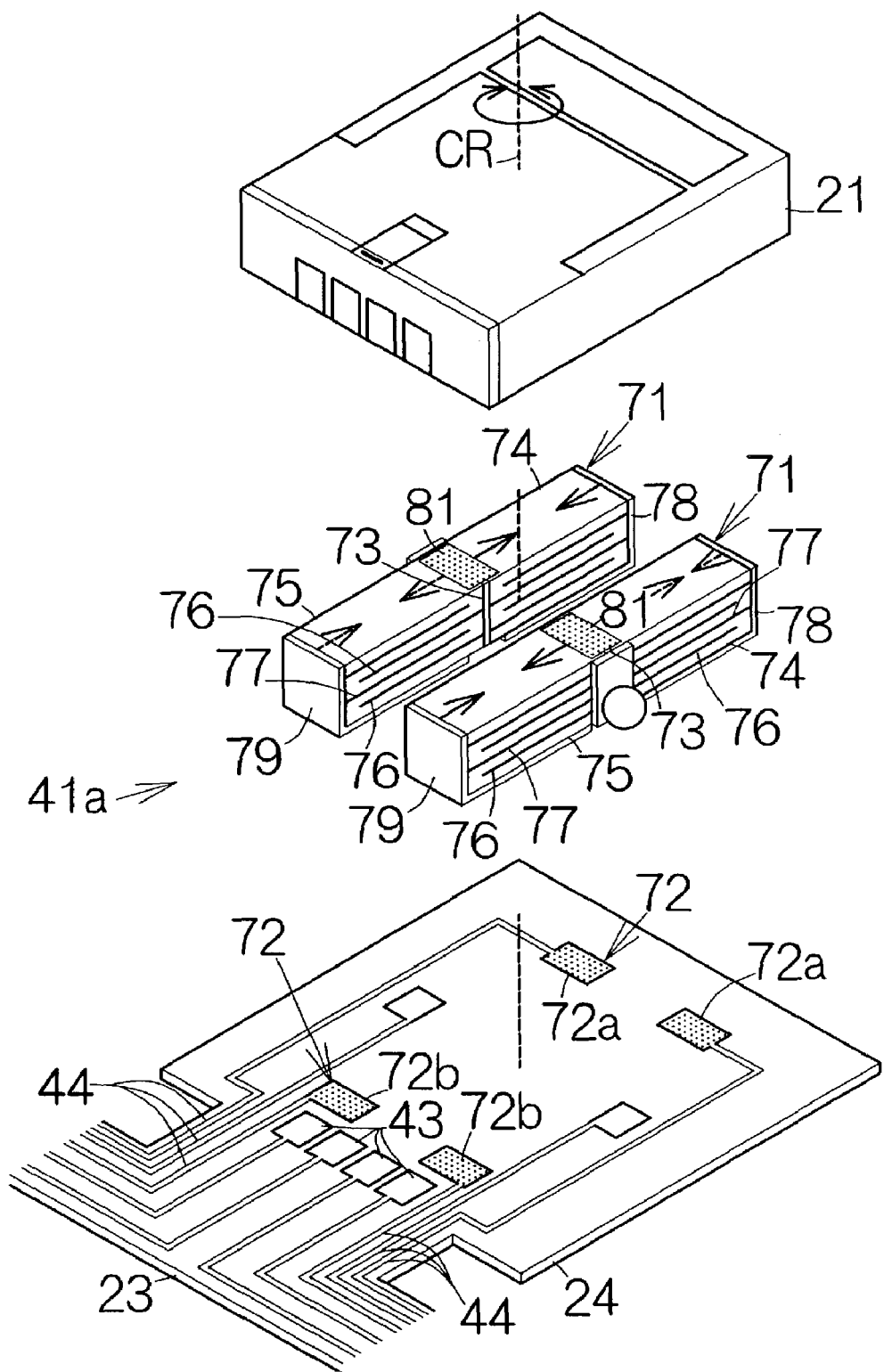
FIG. 10 is an exploded view, corresponding to FIG. 3, of a head suspension assembly for schematically illustrating the structure of a microactuator according to a second embodiment of the present invention.

FIG. 10 schematically illustrates the structure of the microactuator 41*a* according to a second embodiment of the present invention. The microactuator 41*a* includes a pair of piezoelectric elements 71, 71 extending in parallel to each other from the inflow end to the outflow end in the longitudinal direction of the flying head slider 21. The inflow ends of the individual piezoelectric elements 71 are coupled to the plate member 24 of the flexure 23 at first places 72*a*. First adhesive layers 72 serve to establish the connections at the first places 72*a*. Likewise, the outflow ends, opposite to the inflow ends, of the individual piezoelectric elements 71 are coupled to the plate member 24 of the flexure 23 at second places 72*b*. First adhesive layers 72 serve to establish the connections at the second places 72*b*. The first adhesive layers 72 are located symmetrically around the rotational axis CR within a plane perpendicular to the rotational axis CR. The first adhesive layers 72 are individually coupled to the electrically-conductive pattern 44 at the first and second places 72*a*, 72*a*, 72*b*, 72*b*.

The individual piezoelectric element 71 includes first and second driving sections 74, 75. The first driving section 74 is allowed to extend toward the in flow end from a first electrode terminal 73. The first electrode terminal 73 is formed to extend in an upright direction orthogonal to the surface of the plate member 24. The second driving section 75 is allowed to extend from the first electrode terminal 73 toward the outflow end. The first and second driving sections 74, 75 are made of a multilayered structure of piezoelectric ceramic thin plates extending in the longitudinal direction of the flying head slider 21. First and second electrode layers 76, 77 are alternately interposed between the adjacent piezoelectric ceramic thin plates in the first and second driving sections 74, 75. All the first electrode layers 76 are connected to the first electrode terminal 73. The piezoelectric ceramic thin plates may be made of a piezoelectric material such as PNN-PT-PZ, for example. The first and second electrode layers 76, 77 as well as the first electrode terminal 73 may be made of an electrically-conductive metallic material such as Pt, for example.

A second electrode terminal 78 is formed on the inflow end surface of the first driving section 74 in the individual piezoelectric element 71. All the second electrode layers 77 within the first driving section 74 are connected to the second electrode terminal 78. When a driving voltage is applied to the first and second electrode terminals 73, 78, the polarization is first established in the individual piezoelectric ceramic thin plates in accordance with the direction of the driving voltage between the first and second electrode layers 76, 77. The driving voltage is further supplied in the direction of the polarization, so that the first driving section 74 is allowed to shrink in a predetermined direction DR, namely, the longitudinal direction of the flying head slider 21. The second electrode terminal 78 may be made of an electrically-conductive metallic material such as Pt, for example. The first adhesive layer 72 at the first place 72*a* serves to establish the electric connection between the second electrode terminal 78 and the electrically-conductive pattern 44.

Likewise, a third electrode terminal 79 is formed on the outflow end surface of the second driving section 75 in the individual piezoelectric element 71. All the second electrode layers 77 within the second driving section 75 are connected to the third electrode terminal 79. When a driving voltage is applied to the first and third electrode terminals 73, 79, the polarization is first established in the individual piezoelectric ceramic thin plates in accordance with the direction of the driving voltage between the first and second electrode layers 76, 77. The driving voltage is further supplied in the direction of the polarization, so that the second driving section 75 is allowed to shrink in the predetermined direction DR, namely, the longitudinal direction of the flying head slider 21. The third electrode terminal 79 may be made of an electrically-conductive metallic material such as Pt, for example. The first adhesive layer 72 at the second adhesive place 72*b* serves to establish the electric connection between the third electrode terminal 79 and the electrically-conductive pattern 44.

The second adhesive layers 81 serve to couple the piezoelectric elements 71 to the flying head slider 21. The second adhesive layer 81 is allowed to extend along the boundary between the first and second driving sections 74, 75, namely, along the extent of the first electrode terminal 73 in each of the piezoelectric elements 71. In other words, the second adhesive layer 81 is located on the flying head slider 21 between the corresponding first adhesive layers 72 at the first and second places 72*a*, 72*b*. At the same time, the second adhesive layers 81 are positioned symmetrically around the rotational axis CR within a plane perpendicular to the rotational axis CR. Like reference numerals are attached to the structures or components equivalent to those of the aforementioned first embodiment.

When the flying head slider 21 is to be rotated, a driving voltage is applied to the first and second electrode terminals 73, 78 from the electrically-conductive pattern 44 in one of the piezoelectric elements 71. The first driving section 74 is thus allowed to shrink in this piezoelectric element 71. At the same time, a driving voltage is applied to the first and third electrode terminals 73, 79 from the electrically-conductive pattern 44 in the other of the piezoelectric elements 71. The second driving section 75 is allowed to shrink in the other piezoelectric element 71. A couple is generated around the rotational axis CR. The flying head slider 21 is thus forced to rotate around the rotational axis CR. To the contrary, when the second driving section 75 shrinks in the former piezoelectric element 71 while the first driving section 74 shrinks in the latter piezoelectric element 71, the flying head slider 21 is allowed to rotate in the direction opposite to the aforementioned direction around the rotational axis CR.

The plate member 24, the microactuator 41*a* and the flying head slider 21 are held between the clamp members 65, 66 when wire-bonding process is to be effected in the same manner as described above. The plate member 24 and the flying head slider 21 are allowed to receive the urging force from the contact surfaces 65*a*, 66*a* in the direction of the rotational axis CR. The flying head slider 21 is urged against the microactuator 41*a*. The urging force is transmitted to the microactuator 41*a* through the second adhesive layers 81, 81. Since the second adhesive layers 81, 81 are positioned symmetrically around the rotational axis CR, the urging force tends to act on the rotational axis CR. At the same time, the microactuator 4*la* is urged against the plate member 24. The urging force is transmitted from the first adhesive layers 72 to the plate member 24. Since the first adhesive layers 72 are positioned symmetrically around the rotational axis CR, the urging force tends to act on the rotational axis CR. A change can reliably be prevented in the attitude of the flying head slider 21 relative to the microactuator 41*a*. The flying head slider 21 is allowed to keep a uniform attitude perpendicular to the rotational axis CR. Likewise, a change can reliably be prevented in the attitude of the microactuator 41*a* relative to the plate member 24 in the same manner. The microactuator 41*a* is allowed to keep a uniform attitude perpendicular to the rotational axis CR. The piezoelectric elements 71 are prevented from suffering from any bending stresses.

Figure 11:
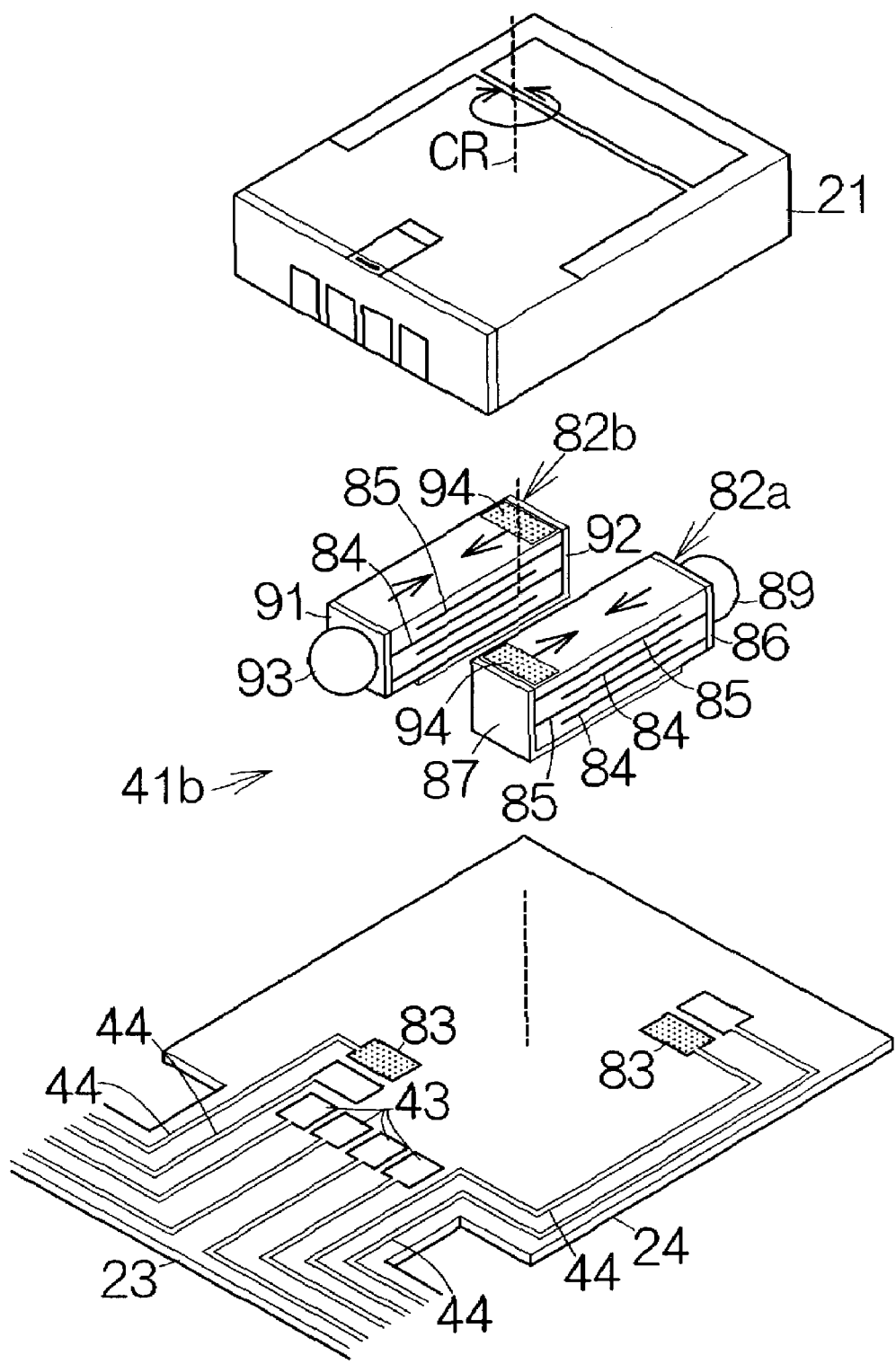
FIG. 11 is an exploded view, corresponding to FIG. 3, of a head suspension assembly for schematically illustrating the structure of a microactuator according to a third embodiment of the present invention.

FIG. 11 schematically illustrates the structure of a microactuator 41*b* according to a third embodiment of the present invention. The microactuator 41*b* includes first and second piezoelectric elements 82*a*, 82*b* extending in parallel with each other in the longitudinal direction of the flying head slider 21. The inflow end of the first piezoelectric element 82*a* is coupled to the plate member 24 of the flexure 23. Likewise, the outflow end of the second piezoelectric element 82*b* is coupled to the plate member 24 of the flexure 23. Electrically-conductive first adhesive layers 83 serve to establish the connections. The first adhesive layers 83 are located symmetrically around the rotational axis CR within a plane perpendicular to the rotational axis CR. The first adhesive layers 83 are individually coupled to the electrically-conductive pattern 44.

The individual piezoelectric element 82*a*, 82*b* is made of a multilayered structure of piezoelectric ceramic thin plates. The piezoelectric ceramic thin plates extend in the longitudinal direction of the flying head slider 21. First and second electrode layers 84, 85 are alternately interposed between the adjacent piezoelectric ceramic thin plates. The piezoelectric ceramic thin plates may be made of a piezoelectric material such as PNN-PT-PZ, for example. The first and second electrode layers 84, 85 may be made of an electrically-conductive metallic material such as Pt, for example.

A first electrode terminal 86 is coupled to the outer surface or inflow end surface of the first piezoelectric element 82*a*. All the first electrode layers 84 are connected to the first electrode terminal 86 in the first piezoelectric element 82*a*. A second electrode terminal 87 is likewise coupled to the outflow end surface of the first piezoelectric element 82*a*. All the second electrode layers 85 are connected to the second electrode terminal 87 in the first piezoelectric element 82*a*. When a driving voltage is applied to the first and second electrode terminals 86, 87, the polarization is first established in the individual piezoelectric ceramic thin plates in accordance with the direction of the driving voltage between the first and second electrode layers 84, 85. The driving voltage is further supplied in the direction of the polarization, so that the first piezoelectric element 82*a* is allowed to shrink in a predetermined direction DR, namely, the longitudinal direction of the flying head slider 21. The first and second electrode terminals 86, 87 may be made of an electrically-conductive metallic material such as Pt, for example. A spherical terminal 89 may be utilized to establish an electric connection between the first electrode terminal 86 and the electrically-conductive pattern 44. The first adhesive layer 83 serves to establish an electric connection between the second electrode terminal 87 and the electrically-conductive pattern 44.

A first electrode terminal 91 is coupled to the outer surface or outflow end surface of the second piezoelectric element 82*b*. All the first electrode layers 84 are connected to the first electrode terminal 91 in the second piezoelectric element 82*b*. A second electrode terminal 92 is likewise coupled to the inflow end surface of the second piezoelectric element 82*b*. All the second electrode layers 85 are connected to the second electrode terminal 92 in the second piezoelectric element 82*b*. When a driving voltage is applied to the first and second electrode terminals 91, 92, the polarization is first established in the individual piezoelectric ceramic thin plates in accordance with the direction of the driving voltage between the first and second electrode layers 84, 85. The driving voltage is further supplied in the direction of the polarization, so that the second piezoelectric element 82*b* is allowed to shrink in the predetermined direction DR, namely, the longitudinal direction of the flying head slider 21. The first and second electrode terminals 91, 92 may be made of an electrically-conductive metallic material such as Pt, for example. A spherical terminal 93 may be utilized to establish an electric connection between the first electrode terminal 91 and the electrically-conductive pattern 44. The first adhesive layer 83 serves to establish an electric connection between the second electrode terminal 92 and the electrically-conductive pattern 44.

A second adhesive layer 94 serves to couple the outflow end of the first piezoelectric element 82*a* to the flying head slider 21. A second adhesive layer 94 likewise serves to couple the inflow end of the second piezoelectric element 82*b* to the flying head slider 21. The second adhesive layers 94 are positioned symmetrically around the rotational axis CR within a plane perpendicular to the rotational axis CR. Like reference numerals are attached to the structures or components equivalent to those of the aforementioned first and second embodiments.

When the flying head slider 21 is to be rotated, a driving voltage is applied to the first and second electrode terminals 86, 87 from the electrically-conductive pattern 44 in the first piezoelectric element 82*a*. The first piezoelectric element 82*a* is thus allowed to shrink in the longitudinal direction. At the same time, a driving voltage is applied to the first and second electrode terminals 91, 92 from the electrically-conductive pattern 44 in the second piezoelectric elements 82*b*. The second piezoelectric element 82*b* is thus allowed shrink in the longitudinal direction. A couple is generated around the rotational axis CR. The flying head slider 21 is thus forced to rotate around the rotational axis CR. When the driving voltage decreases in the first and second piezoelectric elements 82*a*, 82*b*, the flying head slider 21 is allowed to rotate in the direction opposite to the aforementioned direction around the rotational axis CR.

The plate member 24, the microactuator 41*b* and the flying head slider 21 are held between the clamp members 65, 66 when wire-bonding process is to be effected in the same manner as described above. The plate member 24 and the flying head slider 21 are allowed to receive the urging force from the contact surfaces 65*a*, 66*a* in the direction of the rotational axis CR. The flying head slider 21 is urged against the microactuator 41*b*. The urging force is transmitted to the microactuator 41*b* through the second adhesive layers 94, 94. Since the second adhesive layers 94, 94 are positioned symmetrically around the rotational axis CR, the urging force tends to act on the rotational axis CR. At the same time, the microactuator 41*b* is urged against the plate member 24. The urging force is transmitted from the first adhesive layers 83 to the plate member 24. Since the first adhesive layers 83 are positioned symmetrically around the rotational axis CR, the urging force tends to act on the rotational axis CR. A change can reliably be prevented in the attitude of the flying head slider 21 relative to the microactuator 41*b*. The flying head slider 21 is allowed to keep a uniform attitude perpendicular to the rotational axis CR. Likewise, a change can reliably be prevented in the attitude of the microactuator 41*b* relative to the plate member 24 in the same manner. The microactuator 41*b* is allowed to keep a uniform attitude perpendicular to the rotational axis CR.

The piezoelectric elements 82a, 82b are prevented from suffering from any bending stresses.

Figure 12:
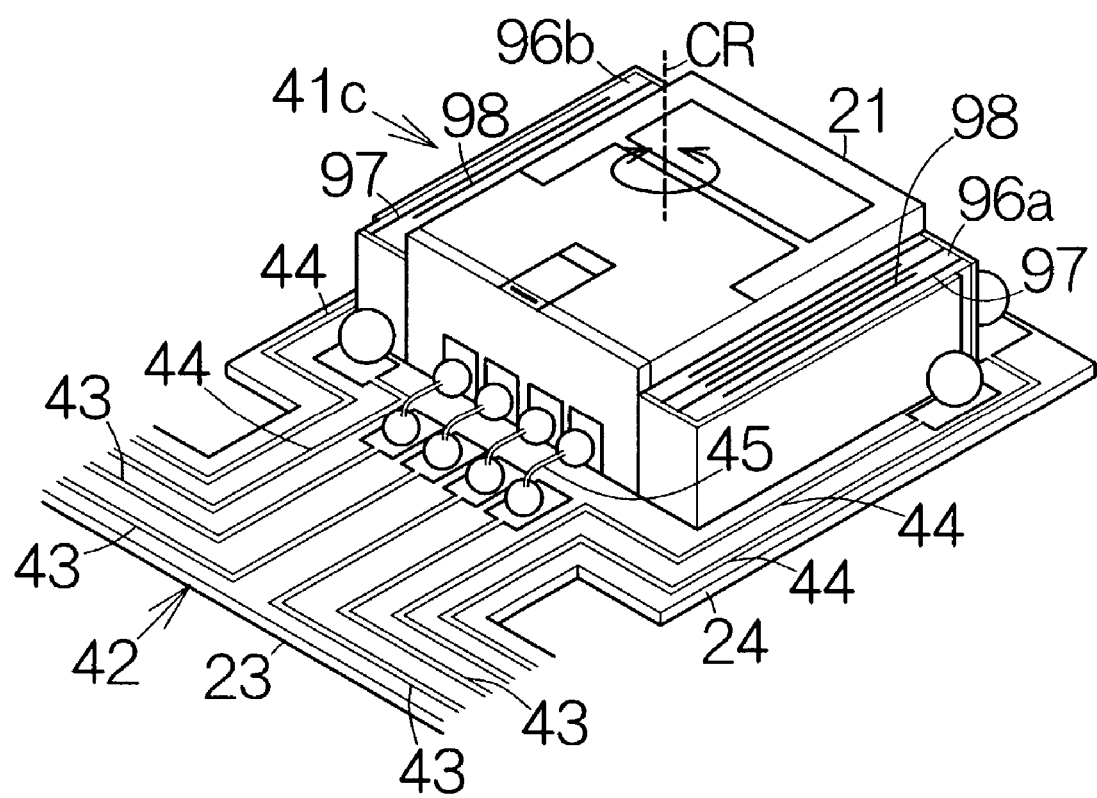
FIG. 12 is an enlarged partial perspective view, corresponding to FIG. 2. of a head suspension assembly for schematically illustrating a microactuator according to a fourth embodiment of the present invention.

FIG. 12 schematically illustrates the structure of a microactuator 41c according to a fourth embodiment of the present invention. The microactuator 41c includes first and second piezoelectric elements 96a, 96b received on a support member or the plate member 24 of the flexure 23. The first and second piezoelectric elements 96a, 96b are allowed to extend in parallel with the flying head slider 21 in the longitudinal direction of the flying head slider 21. The flying head slider 21 positioned in a space between the first and second piezoelectric elements 96a, 96b. Like reference numerals are attached to the structures or components equivalent to those of the aforementioned head suspension assembly 18.

Figure 13:
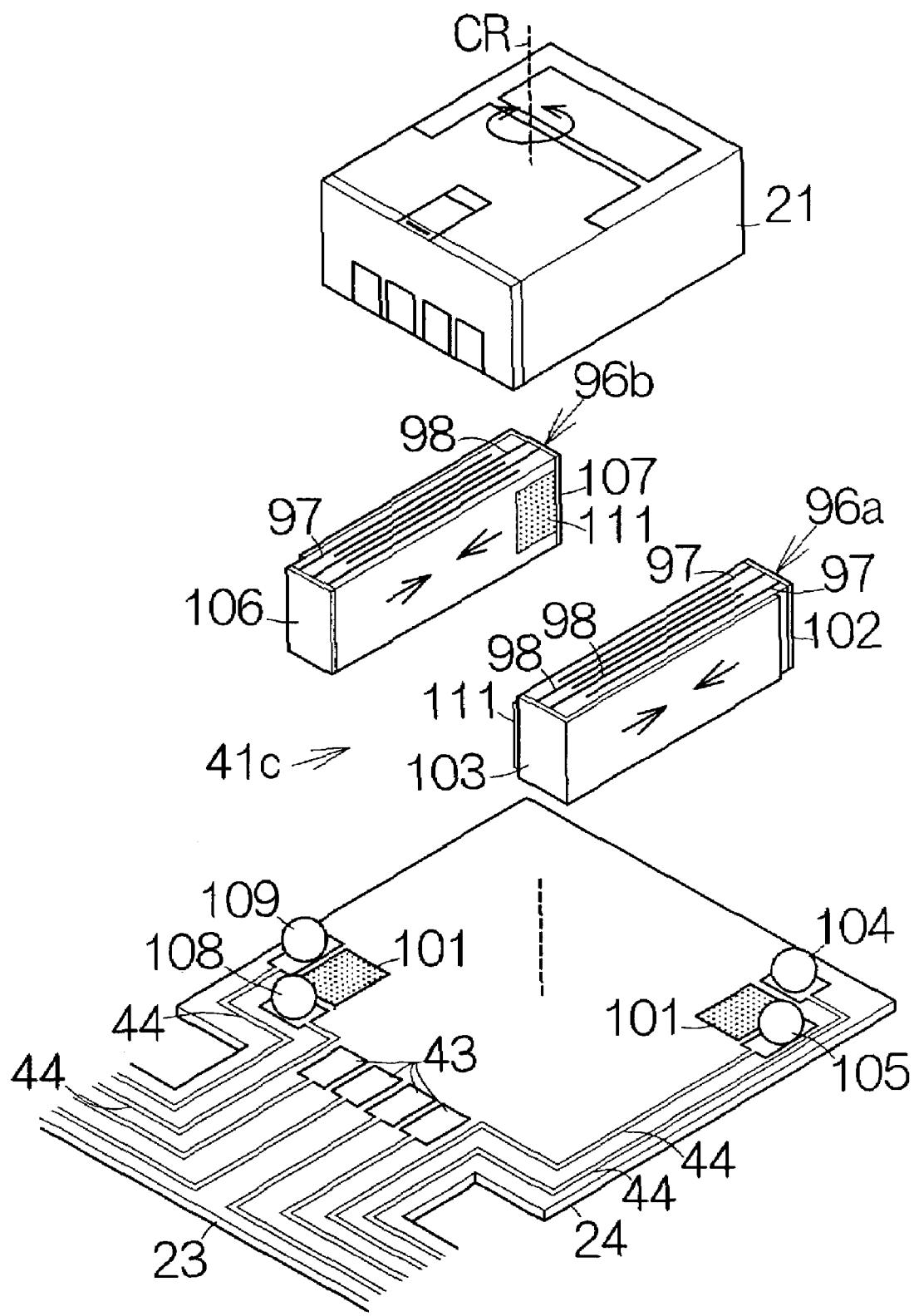
FIG. 13 is an exploded view, corresponding to FIG. 3, of the head suspension assembly for schematically illustrating the structure of the microactuator according to the fourth embodiment.

The individual piezoelectric element 96a, 96b is made of a multilayered structure of piezoelectric ceramic thin plates. The piezoelectric ceramic thin plates extend in the back-and-forth direction of the flying head slider 21. First and second electrode layers 97, 98 are alternately interposed between the adjacent piezoelectric ceramic thin plates. The piezoelectric ceramic thin plates may be made of a piezoelectric material such as PNN-PT-PZ, for example. The first and second electrode layers 97, 98 maybe made of an electrically-conductive metallic material such as Pt, for example. As shown in FIG. 13, the inflow end of the first piezoelectric element 96a is coupled to the plate member 24 of the flexure 23. The outflow end of the second piezoelectric element 96b is coupled to the plate member 24 of the flexure 23. First adhesive layers 101 are utilized to establish the connections.

A first electrode terminal 102 is coupled to the outer surface or inflow end surface of the first piezoelectric element 96a. All the first electrode layers 97 are connected to the first electrode terminal 102 in the first piezoelectric element 96a. A second electrode terminal 103 is likewise coupled to the outflow end surface of the first piezoelectric element 96a. All the second electrode layers 98 are connected to the second electrode terminal 103 in the first piezoelectric element 96a. When a driving voltage is applied to the first and second electrode terminals 102, 103, the polarization is first established in the individual piezoelectric ceramic thin plates in accordance with the direction of the driving voltage between the first and second electrode layers 97, 98. The driving voltage is further supplied in the direction of the polarization, so that the first piezoelectric element 96a is allowed to shrink in the predetermined direction DR, namely, the longitudinal direction of the flying head slider 21. The first and second electrode terminals 102, 103 may be made of an electrically-conductive metallic material such as Pt, for example. Spherical terminals 104, 105 may be utilized to establish electric connections between the first and second electrode terminals 102, 103 and the electrically-conductive pattern 44.

A first electrode terminal 106 is coupled to the outer surface or outflow end surface of the second piezoelectric element 96b. All the first electrode layers 97 are connected to the first electrode terminal 106 in the second piezoelectric element 96b. A second electrode terminal 107 is likewise coupled to the inflow end surface of the second piezoelectric element 96b. All the second electrode layers 98 are connected to the second electrode terminal 107 in the second piezoelectric element 96b. When a driving voltage is applied to the first and second electrode terminals 106, 107, the polarization is first established in the individual piezoelectric ceramic thin plates in accordance with the direction of the driving voltage between the first and second electrode layers 97, 98. The driving voltage is further supplied in the direction of the polarization, so that the second piezoelectric element 96b is allowed to shrink in the predetermined direction DR, namely, the longitudinal direction of the flying head slider 21. The first and second electrode terminals 106, 107 may be made of an electrically-conductive metallic material such as Pt, for example. Spherical terminals 108, 109 may be utilized to establish electric connections between the first and second electrode terminals 106, 107 and the electrically-conductive pattern 44.

A second adhesive layer 111 serves to couple the outflow end of the first piezoelectric element 96a to the flying head slider 21. A second adhesive layer 111 likewise serves to couple the inflow end of the second piezoelectric element 96b to the flying head slider 21. These second adhesive layers 111 are located symmetrically around the rotational axis CR within a plane perpendicular to the rotational axis CR.

When the flying head slider 21 is to be rotated, a driving voltage is applied to the first and second electrode terminals 102, 103 from the electrically-conductive pattern 44 in the first piezoelectric element 96a. The first piezoelectric element 96a is thus allowed to shrink in the longitudinal direction. At the same time, a driving voltage is applied to the first and second electrode terminals 106, 107 from the electrically-conductive pattern 44 in the second piezoelectric elements 96b. The second piezoelectric element 96b is thus allowed shrink in the longitudinal direction. A couple is generated around the rotational axis CR. The flying head slider 21 is thus forced to rotate around the rotational axis CR. When the driving voltage decreases in the first and second piezoelectric elements 96a, 96b, the flying head slider 21 is allowed to rotate in the direction opposite to the aforementioned direction around the rotational axis CR.

The height of the piezoelectric elements 96a, 96b is set smaller than that of the flying head slider 21 in this microactuator 41c of the fourth embodiment. The height should be measured from the surface of the plate member 24, for example. When the plate member 24 and the flying head slider 21 is held between the clamp members 65, 66 during the wire-bonding process in the aforementioned manner, the microactuator 41c can be prevented from contacting the clamp members 65, 66. The microactuator 41c suffers from no urging force at all. In addition, the clamp members 65, 66 surely serve to prevent a change in the attitude of the flying head slider 21 and the plate member 24. The piezoelectric elements 96a, 96b are reliably prevented from suffering from any bending stresses.

What is claimed is:

1. A head assembly, comprising:
a head slider spinning around a rotational axis penetrating through a medium-opposed surface defined on the head slider;
an electrode terminal exposed at a surface of the head slider;
a support member receiving the head slider on a surface of the support member;
an electrically-conductive material exposed at the surface of the support member;
a microactuator connecting the head slider to the support member, the microactuator including a piezoelectric element comprising a multilayered structure of piezoelectric ceramic thin films, each oriented upright in relation to the surface of the support member;
a first adhesive layer extending from the rotational axis over the surface of the support member, across the piezoelectric ceramic thin films, and attaching the microactuator to the support member;

second adhesive layers disposed symmetrically around the rotational axis and attaching the head slider to the microactuator; and an electrically-conductive wire connecting the electrode terminal to the electrically-conductive material.

2. The head assembly according to claim 1, wherein said microactuator comprises:

a pair of attachment plates coupled to the piezoelectric element, said attachment plates being distanced from each other in response to elongation of the piezoelectric element in a direction defined to cross a straight line connecting the second adhesive layers to each other; and a pair of eccentric members coupled to the head slider with the second adhesive layers, each of the eccentric members connected to a corresponding one of the attachment plates.

3. The head assembly according to claim 1, wherein the microactuator generates a couple around the rotation axis based on an electric signal supplied thereto.

4. The head assembly according to claim 1, wherein the first adhesive layer contacts each of the piezoelectric ceramic films so that the piezoelectric ceramic films are fixed to the support member.

5. A head assembly, comprising:

a head slider oriented to spin around a rotational axis penetrating through a medium-opposed surface defined on the head slider;

an electrode terminal exposed at a surface of the head slider;

a support member receiving the head slider on a surface of the support member;

an electrically-conductive material exposed at the surface of the support member;

a microactuator connecting the head slider to the support member, the microactuator including a piezoelectric element made of a multilayered structure of piezoelectric ceramic thin films each oriented upright in relation to the surface of the support member;

first adhesive layers, disposed symmetrically around the rotational axis and extending across the piezoelectric ceramic thin films, attaching the microactuator to the support member;

second adhesive layers disposed symmetrically around the rotational axis and attaching the head slider to the microactuator; and an electrically-conductive wire connecting the electrode terminal to the electrically-conductive material.

6. The head assembly according to claim 5, wherein said microactuator comprises:

a pair of attachment plates coupled to the piezoelectric element, said attachment plates being distanced from each other in response to elongation of the piezoelectric element in a direction defined to cross a straight line connecting the second adhesive layers to each other; and a pair of eccentric members coupled to the head slider with the second adhesive layers, each of the eccentric members connected to a corresponding one of the attachment plates.

7. The head assembly according to claim 5, wherein the microactuator generates a couple around the rotation axis based on an electric signal supplied thereto.

8. The head assembly according to claim 5, wherein the first adhesive layers contact each of the piezoelectric ceramic films so that the piezoelectric ceramic films are fixed to the support member.

9. A head assembly comprising:

a head slider oriented to spin around a rotational axis penetrating through a medium-opposed surface defined on the head slider;

an electrode terminal exposed at a surface of the head slider;

a support member;

an electrically-conductive material exposed at the surface of the support member;

a microactuator including a pair of piezoelectric elements, the piezoelectric elements being received on the support member in parallel with each other so as to sandwich the head slider;

an electrically-conductive wire connecting the electrode terminal to the electrically-conductive material;

first adhesive layers disposed between the head slider and one ends of the piezoelectric elements, respectively; and second adhesive layers disposed between other ends of the piezoelectric elements and the support member, respectively.

10. The head assembly according to claim 9, wherein a height of the piezoelectric elements measured from the surface of the support member is set smaller than a height of the head slider.

11. The head assembly according to claim 9, wherein the first adhesive layers are disposed symmetrically around the rotation axis.

* * * * *